United States Patent
Ichikawa et al.

(10) Patent No.: US 9,246,553 B2
(45) Date of Patent: Jan. 26, 2016

(54) POWER RECEPTION DEVICE AND POWER TRANSMISSION DEVICE

(75) Inventors: Keiichi Ichikawa, Nagaokakyo (JP); Henri Bondar, Kyoto (JP)

(73) Assignee: MURATO MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 743 days.

(21) Appl. No.: 13/557,273

(22) Filed: Jul. 25, 2012

(65) Prior Publication Data

US 2012/0286742 A1 Nov. 15, 2012

Related U.S. Application Data

(63) Continuation of application No. PCT/JP2011/051725, filed on Jan. 28, 2011.

(30) Foreign Application Priority Data

Jan. 29, 2010 (JP) ................................. 2010-017568

(51) Int. Cl.
  *H02J 7/00* (2006.01)
  *H04B 5/00* (2006.01)
  *H02J 17/00* (2006.01)
  *H04L 25/02* (2006.01)
  *H02J 7/02* (2006.01)

(52) U.S. Cl.
  CPC .............. *H04B 5/0037* (2013.01); *H02J 17/00* (2013.01); *H02J 7/025* (2013.01); *H04L 25/0266* (2013.01)

(58) Field of Classification Search
  CPC ...... H02J 7/025; H04B 5/0012; H04B 5/0037
  USPC .................................................. 320/137, 108
  See application file for complete search history.

(56) References Cited

U.S. PATENT DOCUMENTS

| | | | |
|---|---|---|---|
| 4,942,352 A * | 7/1990 | Sano | 320/134 |
| 5,475,351 A | 12/1995 | Uematsu et al. | |
| 5,572,441 A | 11/1996 | Boie | |
| 5,581,130 A * | 12/1996 | Boucheron | 307/10.1 |
| 8,242,638 B2 * | 8/2012 | Camurati et al. | 307/104 |

(Continued)

FOREIGN PATENT DOCUMENTS

| | | |
|---|---|---|
| JP | 6-150079 A | 5/1994 |
| JP | 63-12082 A | 11/1994 |
| JP | 7-094928 A | 4/1995 |

(Continued)

OTHER PUBLICATIONS

PCT/JP2011/051725 International Search Report dated Apr. 19, 2011.

*Primary Examiner* — Samuel Berhanu
*Assistant Examiner* — Tarikh Rankine
(74) *Attorney, Agent, or Firm* — Arent Fox LLP

(57) ABSTRACT

A power reception device and a power transmission device which are capable of suppressing an adverse effect of an electric field. A power reception device includes a capacitive coupling electrode comprising a high voltage side conductor and a low voltage side conductor extending around the high voltage side conductor. The high voltage side conductor is disposed on a surface of a housing. The low voltage side conductor is disposed inside a circuit board. A plurality of module parts are mounted on a surface of the circuit board which is located on an opposite side away from the high voltage side conductor with respect to the low voltage side conductor.

20 Claims, 8 Drawing Sheets

(56) References Cited

U.S. PATENT DOCUMENTS

| | | | |
|---|---|---|---|
| 2007/0126393 A1* | 6/2007 | Bersenev | 320/107 |
| 2008/0106160 A1* | 5/2008 | Yoshinari et al. | 310/68 D |
| 2009/0015509 A1* | 1/2009 | Gottwald et al. | 343/878 |
| 2009/0067198 A1* | 3/2009 | Graham et al. | 363/8 |
| 2009/0146608 A1* | 6/2009 | Lee | 320/108 |
| 2009/0206675 A1 | 8/2009 | Camurati | |
| 2009/0302690 A1 | 12/2009 | Kubono et al. | |
| 2010/0061035 A1* | 3/2010 | Kitamura et al. | 361/301.4 |

FOREIGN PATENT DOCUMENTS

| | | | |
|---|---|---|---|
| JP | 2001-289885 A | 10/2001 | |
| JP | 2003-284252 A | 10/2003 | |
| JP | 2009-531009 A | 8/2009 | |
| JP | 2009-296857 A | 12/2009 | |
| WO | WO 2007107642 A1 * | 9/2007 | 307/104 |

* cited by examiner

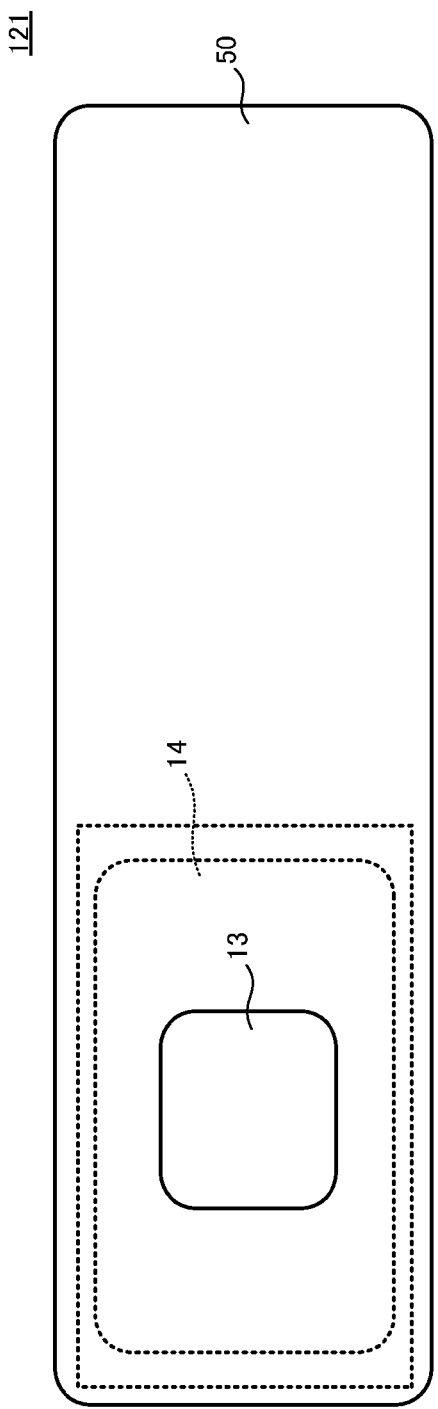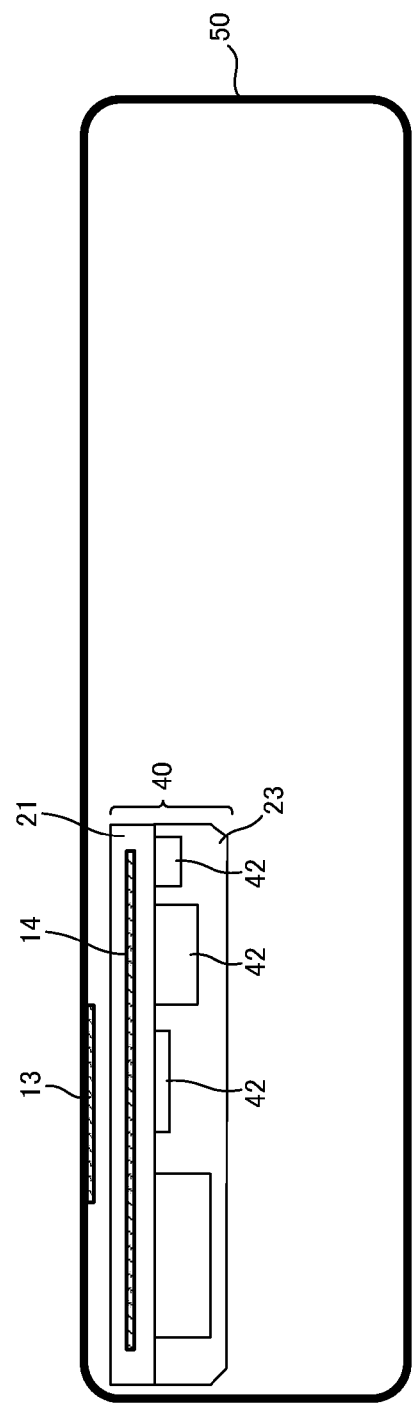

POWER RECEPTION DEVICE AND POWER TRANSMISSION DEVICE

CROSS REFERENCE TO RELATED APPLICATIONS

The present application is a continuation of International application No. PCT/JP2011/051725, filed Jan. 28, 2011, which claims priority to Japanese Patent Application No. 2010-017568, filed Jan29, 2010, the entire contents of each of which are incorporated herein by reference.

FIELD OF THE INVENTION

The present invention relates to a power reception device and a power transmission device which transfers electric power in a noncontact manner.

BACKGROUND OF THE INVENTION

Patent Literature 1 discloses a system configured to transfer electric power through capacitive coupling.

The power transfer system described in Patent Literature 1 comprises: a power transmission device including a high-frequency high-voltage generator, a passive electrode, and an active electrode; and a power reception device including a high-frequency high-voltage load, a passive electrode, and an active electrode.

FIG. 1 is a view illustrating the basic configuration of the power transfer system disclosed in Patent Literature 1. The power transmission device includes a high-frequency high-voltage generator 1, a passive electrode 2, and an active electrode 3. The power reception device includes a high-frequency high-voltage load 5, a passive electrode 7, and an active electrode 6. The active electrode 3 of the power transmission device and the active electrode 6 of the power reception device are located in proximity to each other via a gap 4, so that the two electrodes are capacitively coupled to each other.

Patent Literature 1: National Publication of International Patent Application No. 2009-531009

SUMMARY OF THE INVENTION

Patent Literature 1 describes the basic configuration for power transfer through capacitive coupling. However, Patent Literature 1 discloses no specific configuration to be incorporated in a device.

Accordingly, it is an object of the present invention to provide a configuration which enables the power reception device and the power transmission device to be incorporated in an actual device and which is capable of suppressing an adverse effect of an electric field.

A power reception device according to the present invention includes: a power reception device side capacitive coupling electrode comprising a high voltage side conductor and a low voltage side conductor extending around the high voltage side conductor; a load circuit; and an electric feeder circuit configured to feed electric power induced between the high voltage side conductor and the low voltage side conductor to the load, the electric feeder circuit comprising module parts, at least an active part of which is disposed on an opposite side away from the high voltage side conductor with respect to the low voltage side conductor.

For example, the electric feeder circuit includes at least one of a step-down circuit, a rectifier circuit and a charger circuit.

For example, the module parts forming the electric feeder circuit are mounted on a circuit board, while the low voltage side conductor is formed in the circuit board.

For example, the low voltage side conductor is formed to surround the high voltage side conductor in a plane.

For example, the power reception device includes a housing which houses the high voltage side conductor, the low voltage side conductor, the electric feeder circuit, and the load therein.

For example, the load is a secondary battery which is disposed on the opposite side away from the high voltage side conductor with respect to the low voltage side conductor.

A power transmission device according to the present invention includes: a power transmission device side capacitive coupling electrode comprising a high voltage side conductor and a low voltage side conductor extending around the high voltage side conductor; and a high-frequency high-voltage generator configured to apply a high voltage of high frequency to between the high voltage side conductor and the low voltage side conductor, the high-frequency high-voltage generator comprising module parts, at least an active part of which is disposed on an opposite side away from the high voltage side conductor with respect to the low voltage side conductor.

For example, the module parts forming the high-frequency high-voltage generator are mounted on a circuit board, while the low voltage side conductor is formed in the circuit board.

For example, the low voltage side conductor is formed to surround the high voltage side conductor in a plane.

For example, the power transmission device includes a housing which houses the high voltage side conductor, the low voltage side conductor, and the high-frequency high-voltage generator therein.

According to the present invention, it is possible to protect the active part which is susceptible to an electric field generated from the high voltage side conductor by the low voltage side conductor, thereby to suppress the adverse effect of the electric field. When all the module parts are disposed on the opposite side away from the high voltage side conductor, the distance between the high voltage side conductor and the low voltage side conductor can be shortened, which leads to downsizing of the device.

By mounting the module parts on the circuit board, the device can be downsized further.

Since the low voltage side conductor is formed to surround the high voltage side conductor in a plane, unnecessary radiation from the high voltage side conductor can be reduced.

Further, since the secondary battery serving as the load in the power reception device is disposed on the opposite side away from the high voltage side conductor with respect to the low voltage side conductor, it is possible to protect the circuit inside the battery from the electric field generated from the high voltage side conductor, thereby to reduce the adverse effect of the electric field.

BRIEF DESCRIPTION OF THE DRAWINGS

FIG. 6A is a top plan view illustrating a power transmission device 121, and FIG. 6B is a sectional view of the power transmission device.

DETAILED DESCRIPTION OF THE PREFERRED EMBODIMENTS

[First Embodiment]

The configuration of a power reception device according to a First Embodiment will be described with reference to FIGS. 2A, 2B and 3.

Figure 1:
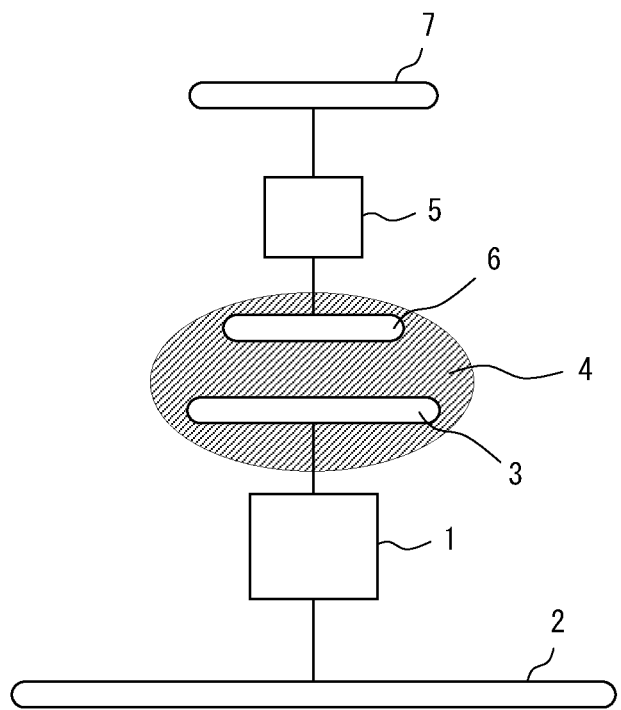
FIG. 1 is a view illustrating the basic configuration of a power transfer system described in Patent Literature 1.
Figure 2A:
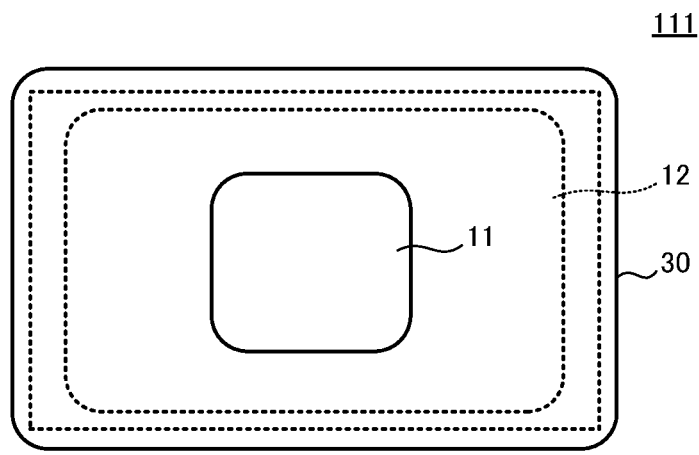
FIG. 2A is a top plan view illustrating a power reception device 111.
Figure 2B:
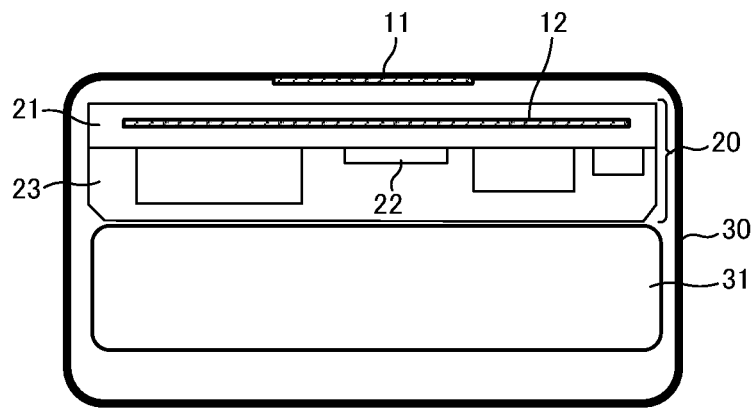
FIG. 2B is a sectional view of the power reception device.

FIG. 2A is a top plan view illustrating a power reception device 111, and FIG. 2B is a sectional view of the power reception device. For the purpose of avoiding complication in these figures, hatching is omitted from the sectional view except electrode portions.

The power reception device 111 includes a capacitive coupling electrode to be coupled to a capacitive coupling electrode of a non-illustrated power transmission device. The capacitive coupling electrode of the power reception device 111 comprises a high voltage side conductor 11 shown in FIGS. 2A-2B and a low voltage side conductor 12 extending around the high voltage side conductor 11.

The power reception device 111 includes an electrically insulating housing 30. In the example shown, the high voltage side conductor 11 is disposed on a surface of the housing 30. The low voltage side conductor 12 is disposed inside a circuit board 21.

A plurality of module parts 22 forming an electric feeder circuit are mounted on a surface of the circuit board 21 (specifically a lower surface of the circuit board 21 in the position shown in FIGS. 2A and 2B). These module parts include an active part. The side of the circuit board 21 on which the module parts 22 are mounted is encapsulated with a molding resin 23.

The circuit board 21 formed with the low voltage side conductor 12, the module parts 22 and the molding resin 23 form a module 20. The high voltage side conductor 11 is connected to the module 20 through an interconnection conductor.

The module 20 is provided with the electric feeder circuit configured to feed electric power induced between the high voltage side conductor 11 and the low voltage side conductor 12 to a load. The housing 30 houses therein a secondary battery 31 to be charged through the electric feeder circuit.

The plurality of module parts 22 are mounted on the lower surface of the circuit board 21 which is located on the opposite side away from the high voltage side conductor 11 with respect to the low voltage side conductor 12.

The non-illustrated power transmission device also includes a high voltage side conductor and a low voltage side conductor. The high voltage side conductor 11 of the power reception device is opposed to the high voltage side conductor of the power transmission device, while the low voltage side conductor 12 of the power reception device is opposed to the low voltage side conductor of the power transmission device.

With this configuration, electric power is transferred through capacitive coupling. Thus, the power reception device and the power transmission device form a power transfer system.

Figure 3:
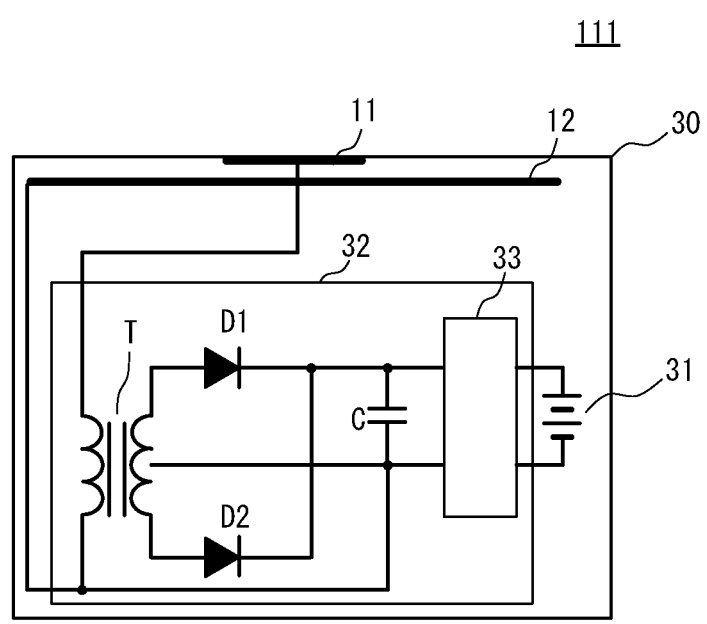
FIG. 3 is a view illustrating the configuration of an electric feeder circuit provided inside the power reception device 111 shown in FIGS. 2A and 2B.

FIG. 3 is a view illustrating the configuration of the electric feeder circuit disposed inside the power reception device 111 shown in FIGS. 2A and 2B. An electric feeder circuit 32 includes a step-down transformer T, rectifier diodes D1 and D2, and a smoothing capacitor C. The transformer T has a primary winding with one terminal connected to the high voltage side conductor 11 and the other terminal connected to the low voltage side conductor 12. A secondary winding of the transformer T is connected to a full-wave rectifier circuit comprising the rectifier diodes D1 and D2 and the smoothing capacitor C.

The full-wave rectifier circuit has an output terminal connected to a charger circuit 33. The charger circuit 33 charges the secondary battery 31 by a predetermined charging method.

The configuration described above makes the low voltage side conductor 12 protect those module parts which are susceptible to an electric field generated from the high voltage side conductor 11, thereby suppressing the adverse effect of the electric field. Though all the module parts need not be disposed on the opposite side away from the high voltage side conductor, it is effective that an active part having fine pitch interconnections is disposed on the opposite side away from the high voltage side conductor because such an active part is particularly susceptible to an electric field. Likewise, a passive device formed using fine pitch interconnections and a high-impedance circuit are susceptible to an electric field and, hence, it is effective that these components are disposed on the opposite side away from the high voltage side conductor. When all the module parts are disposed on the opposite side away from the high voltage side conductor, the distance between the high voltage side conductor 11 and the low voltage side conductor 12 can be shortened, which leads to downsizing of the device.

Further, by mounting the module parts on the circuit board, the device can be downsized further.

While the low voltage side conductor 12 is disposed inside the circuit board 21 according to the present embodiment, the low voltage side conductor 12 may be disposed on a surface of the circuit board 21.

When the secondary battery 31 serving as the load in the power reception device 111 is disposed on the opposite side away from the high voltage side conductor 11 with respect to the low voltage side conductor 12, it is possible to protect the secondary battery 31 from the electric field generated from the high voltage side conductor 11, thereby to reduce the adverse effect of the electric field.

[Second Embodiment]

The configuration of a power reception device according to a Second Embodiment will be described with reference to FIGS. 4A and 4B.

Figure 4A:
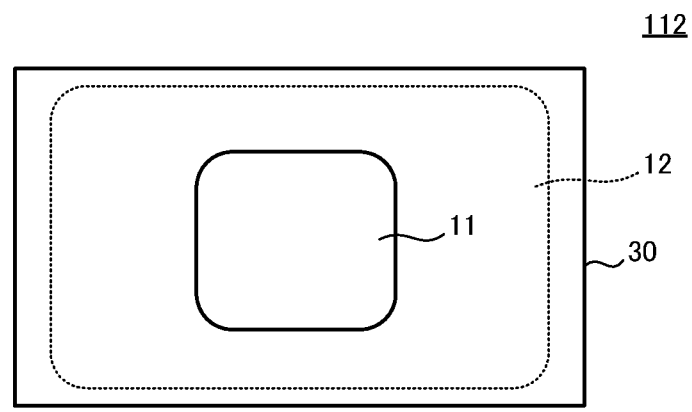
FIG. 4A is a top plan view illustrating a power reception device 112.
Figure 4B:
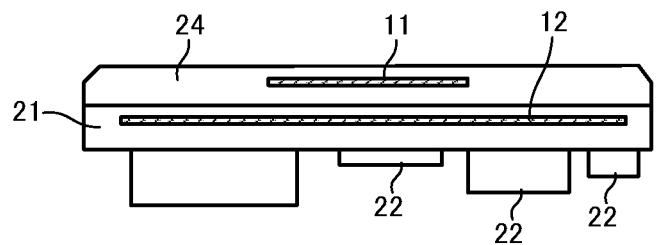
FIG. 4B is a sectional view of the power reception device.
Figure 5A:
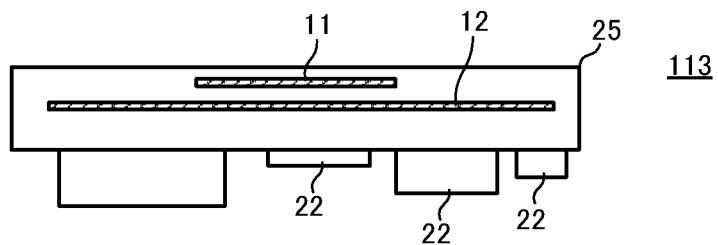
FIGS. 5A-5D are sectional views illustrating four power reception devices 113 to 116.
Figure 5B:
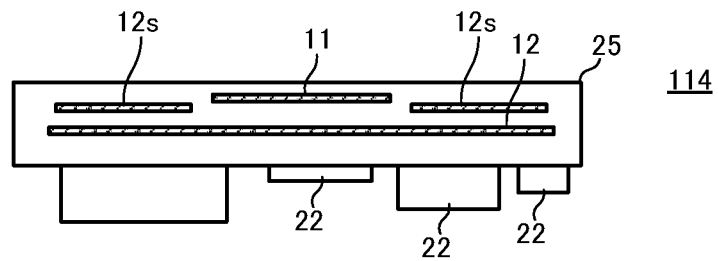
Figure 5C:
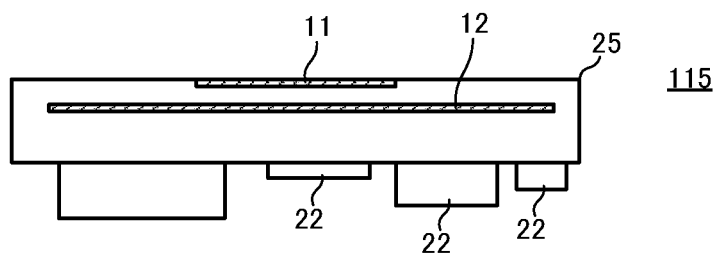
Figure 5D:
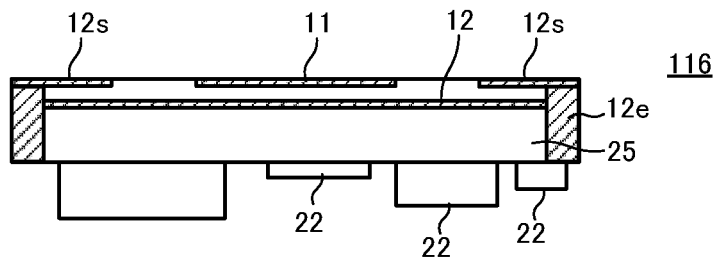

FIG. 4A is a top plan view illustrating a power reception device 112, and FIG. 4B is a sectional view of the power reception device. For the purpose of avoiding complication in these figures, hatching is omitted from the sectional view except electrode portions.

The power reception device 112 includes a capacitive coupling electrode to be coupled to a capacitive coupling electrode of a non-illustrated power transmission device. The capacitive coupling electrode of the power reception device 112 comprises a high voltage side conductor 11 shown in FIGS. 4A-4B and a low voltage side conductor 12 extending around the high voltage side conductor 11.

In the example shown, the high voltage side conductor 11 which is in a state of being encapsulated with a molding resin 24 is integrated with a circuit board 21. The low voltage side conductor 12 is disposed inside the circuit board 21.

A plurality of module parts 22 are mounted on a surface of the circuit board 21 (specifically a lower surface of the circuit board 21 in the position in FIGS. 4A and 4B) which is located on the opposite side away from the high voltage side conductor 11 with respect to the low voltage side conductor 12. These module parts 22 include an active part.

Thus, the high voltage side conductor 11 can be formed integrally with the module.

[Third Embodiment]

Several power reception devices having different configurations according to a Third Embodiment will be described with reference to FIGS. 5A-5D.

FIGS. 5A-5D is a sectional view illustrating power reception devices 113 to 116. For the purpose of avoiding complication in these figures, hatching is omitted from each of the sectional views except electrode portions. Any one of the power reception devices 113 to 116 includes a high voltage side conductor 11 and a low voltage side conductor 12 which are formed in a multilayer board 25. A plurality of module parts 22 are mounted on a surface of the multilayer board 25 which is located on the opposite side away from the high voltage side conductor 11 with respect to the low voltage side conductor 12.

The high voltage side conductors 11 of the respective power reception devices 113 and 114 are each formed at an internal layer of the multilayer board 25. The high voltage side conductors 11 of the respective power reception devices 115 and 116 are each formed at a surface layer of the multilayer board 25.

Low voltage side conductors 12s are each formed around a respective one of the high voltage side conductors 11 of the power reception devices 114 and 116 so as to surround the associated high voltage side conductor 11 in a plane. Each of the low voltage side conductors 12s has electrical continuity with the associated one of the low voltage side conductors 12.

These configurations can reduce unnecessary radiation from the high voltage side conductors 11 by the electric field shielding effect of the low voltage side conductors 12s. The configurations also can increase the coupling capacitance between the low voltage side conductor of each power reception device and the low voltage side conductor of the associated power transmission device, thereby improving electric characteristics such as the power transfer efficiency and the transferred power. Further, the configurations can increase the coupling capacitance between the low voltage side conductors and hence can lower the driving voltage for each high voltage side conductor which is required to transfer a fixed power.

The power reception device 116 has low voltage side conductors 12e on the four side surfaces of the multilayer board 25. This structure can enjoy a further enhanced electric field shielding effect around the high voltage side conductor 11. Further, since the low voltage side conductors 12e on the side surfaces provide electric continuity between the low voltage side conductor 12s and the low voltage side conductor 12, the space of the multilayer board 25 can be effectively utilized, which leads to downsizing of the device.

[Fourth Embodiment]

The configuration of a power transmission device according to a Fourth Embodiment will be described with reference to FIGS. 6A and 6B.

FIG. 6A is a top plan view illustrating a power transmission device 121, and FIG. 6B is a sectional view of the power transmission device. For the purpose of avoiding complication in these figures, hatching is omitted from the sectional view except electrode portions.

The power transmission device 121 includes a capacitive coupling electrode to be coupled to a capacitive coupling electrode of a non-illustrated power reception device. The capacitive coupling electrode of the power transmission device 121 comprises a high voltage side conductor 13 shown in FIGS. 6A-6B and a low voltage side conductor 14 extending around the high voltage side conductor 13.

The power transmission device 121 includes an electrically insulating housing 50. In the example shown, the high voltage side conductor 13 is disposed near a surface of the housing 50. The low voltage side conductor 14 is disposed inside a circuit board 21.

A plurality of module parts 42 are mounted on a surface of the circuit board 21 (specifically a lower surface of the circuit board 21 in the position shown in FIGS. 6A and 6B) which is located on the opposite side away from the high voltage side conductor 13 with respect to the low voltage side conductor 14. These module parts 42 include an active part. The side of the circuit board 21 on which the module parts 42 are mounted is encapsulated with a molding resin 23.

The circuit board 21 formed with the low voltage side conductor 14, the module parts 42 and the molding resin 23 form a module 40. The high voltage side conductor 13 is connected to the module 40 through an interconnection conductor. The module 40 is provided with a high-frequency high-voltage generator configured to apply a high voltage of high frequency to between the high voltage side conductor 13 and the low voltage side conductor 14.

The non-illustrated power reception device also includes a high voltage side conductor and a low voltage side conductor. The high voltage side conductor 13 of the power transmission device is opposed to the high voltage side conductor of the power reception device, while the low voltage side conductor 14 of the power transmission device is opposed to the low voltage side conductor of the power reception device. With this configuration, electric power is transferred through capacitive coupling.

The configuration described above makes the low voltage side conductor 14 protect those module parts which are susceptible to the effect of the voltage of the high voltage side conductor 13, thereby suppressing the adverse effect of an electric field. Though all the module parts need not be disposed on the opposite side away from the high voltage side conductor, this configuration and the First Embodiment share the features that: disposing an active part on the opposite side away from the high voltage side conductor is effective; and disposing all the module parts on the opposite side away from the high voltage side conductor leads to downsizing of the device.

When the low voltage side conductor 14 is formed to surround the high voltage side conductor 13 in a plane, unnecessary radiation from the high voltage side conductor 13 can be reduced as in the Third Embodiment.

[Fifth Embodiment]

The configuration of a power reception device according to a Fifth Embodiment will be described with reference to FIGS. 7A, 7B and 8.

Figure 7A:
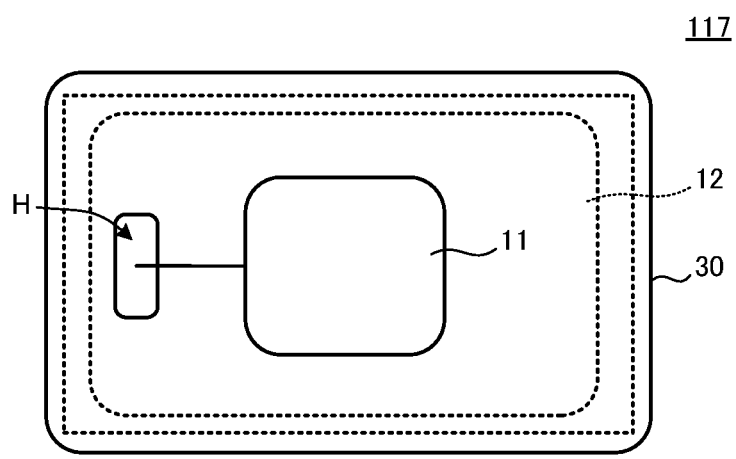
FIG. 7A is a top plan view illustrating a power reception device 117.
Figure 7B:
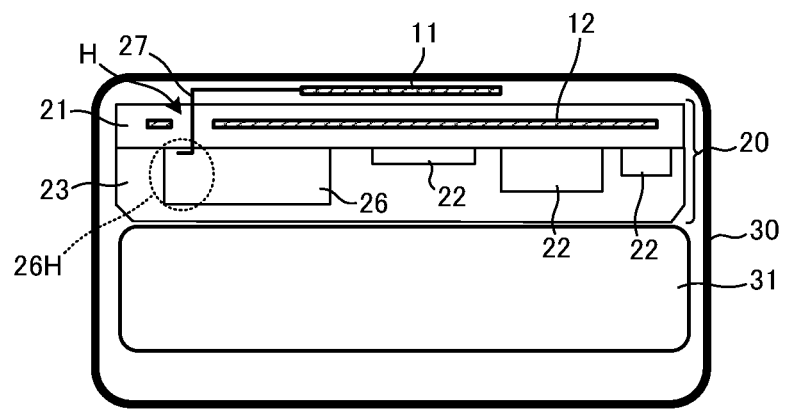
FIG. 7B is a sectional view of the power reception device.

FIG. 7A is a top plan view illustrating a power reception device 117, and FIG. 7B is a sectional view of the power reception device. For the purpose of avoiding complication in these figures, hatching is omitted from the sectional view except electrode portions.

Figure 8:
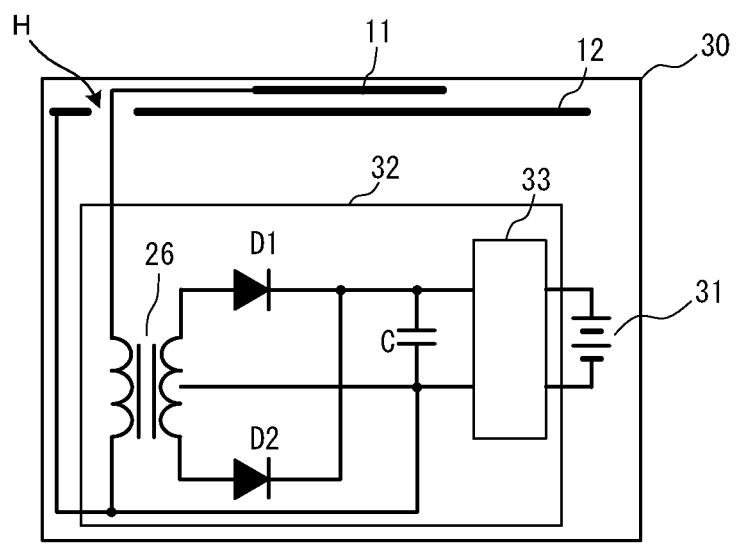
FIG. 8 is a view illustrating the configuration of an electric feeder circuit provided inside the power reception device 117 shown in FIGS. 7A and 7B.

FIG. 8 is a view illustrating the configuration of an electric feeder circuit provided inside the power reception device 117 shown in FIGS. 7A and 7B.

The power reception device 117 includes a capacitive coupling electrode comprising a high voltage side conductor 11 and a low voltage side conductor 12 extending around the high voltage side conductor 11.

The high voltage side conductor 11 of the power reception device 117 is disposed near a surface of an electrically insulating housing 30. The low voltage side conductor 12 is disposed inside a circuit board 21.

A plurality of module parts 22 and a step-down transformer 26 which form an electric feeder circuit are mounted on a surface of the circuit board 21 (specifically a lower surface of the circuit board 21 in the position shown in FIGS. 7A and 7B). The side of the circuit board 21 on which the module parts 22 and the step-down transformer 26 are mounted is encapsulated with a molding resin 23. These module parts include an active part.

The step-down transformer 26 has a high voltage portion 26H connected to the high voltage side conductor 11 through an interconnection conductor 27.

The circuit board 21 formed with the low voltage side conductor 12, the step-down transformer 26, the module parts 22 and the molding resin 23 form a module 20.

The module 20 is provided with the electric feeder circuit configured to feed electric power induced between the high voltage side conductor 11 and the low voltage side conductor 12 to a load. The housing 30 houses therein a secondary battery 31 to be charged through the electric feeder circuit.

The plurality of module parts 22 are mounted on the lower surface of the circuit board 21 which is located on the opposite side away from the high voltage side conductor 11 with respect to the low voltage side conductor 12.

A non-illustrated power transmission device also includes a high voltage side conductor and a low voltage side conductor. The high voltage side conductor 11 of the power reception device is opposed to the high voltage side conductor of the power transmission device, while the low voltage side conductor 12 of the power reception device is opposed to the low voltage side conductor of the power transmission device. With this configuration, electric power is transferred through capacitive coupling.

In the Fifth Embodiment, the step-down transformer 26 and the module parts 22 are disposed such that the high voltage portion 26H of the step-down transformer 26 is located away from any module part 22 other than the step-down transformer 26. In the example shown, the position and orientation of the step-down transformer 29 are determined such that the high voltage portion 26H which forms the primary side of the step-down transformer 26 is located on the far side away from the module parts 22 while the low voltage portion which forms the secondary side of the step-down transformer 26 is located on the near side close to the module parts 22.

With such a structure, the module parts 22 become hard to affect not only by an electric field generated from the high voltage side conductor 11 but also by an electric field generated from the interconnection conductor 27 associated with the high voltage side conductor 11 and an electric field generated from the high voltage side 26H of the step-down transformer. Thus, this structure can suppress the adverse effect of electric fields.

In the example shown, the low voltage side conductor 12 is formed with an opening H to allow the interconnection conductor 27 to extend therethrough. Alternatively, it is possible that one side of the low voltage side conductor 12 is formed with a notch to allow the interconnection conductor 27 to extend therethrough.

[Other Embodiments]

In the Fifth Embodiment, the position and orientation of the transformer of the power reception device are exemplified. With respect to the power transmission device, similarly, a step-up transformer is simply disposed such that the high voltage side thereof which forms the secondary side of the step-up transformer is located away from the module parts (particularly an active part). With such a structure, the module parts (particularly the active part) become hard to affect not only by an electric field generated from the high voltage side conductor but also by an electric field generated from the interconnection conductor associated with the high voltage side conductor and an electric field generated from the high voltage side of the step-up transformer. Thus, this structure can suppress the adverse effect of electric fields.

REFERENCE SIGNS LIST 11 high voltage side conductor
12 low voltage side conductor
12$e$ low voltage side conductor
12$s$ low voltage side conductor
20 module
21 circuit board
22 module parts
23,24 molding resin
25 multilayer board
30 housing
31 secondary battery
32 electric feeder circuit
33 charger circuit
40 module
42 module parts
50 housing
111 to 116 power reception devices
121 power transmission device

The invention claimed is:

1. A power reception device for use in a power transfer system configured to transfer electric power through capacitive coupling, the power reception device comprising:
    a power reception device side capacitive coupling electrode comprising a high voltage side conductor and a low voltage side conductor extending around the high voltage side conductor; and
    an electric feeder circuit configured to feed electric power induced between the high voltage side conductor and the low voltage side conductor to a load,
    wherein the electric feeder circuit comprises module parts and at least one of the module parts is an active part disposed in the power reception device such that the low voltage side conductor is positioned between the active part and the high voltage side conductor.

2. The power reception device according to claim 1, wherein the electric feeder circuit includes at least one of a step-down circuit, a rectifier circuit and a charger circuit.

3. The power reception device according to claim 1, wherein the module parts of the electric feeder circuit are mounted on a circuit board, and the low voltage side conductor is located in the circuit board.

4. The power reception device according to claim 3, wherein the module parts are encapsulated within a resin.

5. The power reception device according to claim 3, wherein the high voltage side conductor is encapsulated within a resin and integrated with the circuit board.

6. The power reception device according to claim 1, wherein the low voltage side conductor is shaped so as to surround the high voltage side conductor in a plane.

7. The power reception device according to claim 1, further comprising a housing which houses the high voltage side conductor, the low voltage side conductor, the electric feeder circuit, and the load therein.

8. The power reception device according to claim 1, wherein the load is a secondary battery which is disposed on the side of the low voltage side conductor opposite to the high voltage side conductor.

9. The power reception device according to claim 1, wherein the active part is encapsulated within a resin.

10. The power reception device according to claim 1, wherein the low voltage side conductor includes a first main surface and a second main surface opposite the first main surface and all of the module parts are disposed on a side of the first main surface of the low voltage side conductor and the high voltage side conductor is disposed on a side of the second main surface of the low voltage side conductor.

11. The power reception device according to claim 10, wherein all the module parts are encapsulated within a resin.

12. The power reception device according to claim 1, wherein the high voltage side conductor is encapsulated within a resin.

13. The power reception device according to claim 1, wherein the high voltage side conductor and the low voltage side conductor are located within a multilayer board.

14. The power reception device according to claim 13, wherein the high voltage side conductor is located at a surface layer of the multilayer board.

15. The power reception device according to claim 13, wherein the low voltage side conductor is shaped so as to surround the high voltage side conductor in a plane.

16. The power reception device according to claim 15, wherein the low voltage side conductor is further shaped so as to extend along at least one side of the multilayer board.

17. A power transmission device for use in a power transfer system configured to transfer electric power through capacitive coupling, the power transmission device comprising:
    a power transmission device side capacitive coupling electrode comprising a high voltage side conductor and a low voltage side conductor extending around the high voltage side conductor; and
    a high-frequency high-voltage generator configured to apply a high voltage of high frequency to between the high voltage side conductor and the low voltage side conductor,
    wherein the high-frequency high-voltage generator comprises module parts and at least one of the module parts is an active part disposed in the power transmission device such that the low voltage side conductor is positioned between the active part and the high voltage side conductor.

18. The power transmission device according to claim 17, wherein the module parts forming the high-frequency high-voltage generator are mounted on a circuit board, and the low voltage side conductor is located in the circuit board.

19. The power transmission device according to claim 17, wherein the low voltage side conductor is shaped so as to surround the high voltage side conductor in a plane.

20. The power transmission device according to claim 17, further comprising a housing which houses the high voltage side conductor, the low voltage side conductor, and the high-frequency high-voltage generator therein.

* * * * *

UNITED STATES PATENT AND TRADEMARK OFFICE
CERTIFICATE OF CORRECTION

PATENT NO. : 9,246,553 B2  
APPLICATION NO. : 13/557273  
DATED : January 26, 2016  
INVENTOR(S) : Keiichi Ichikawa et al.

It is certified that error appears in the above-identified patent and that said Letters Patent is hereby corrected as shown below:

On the title page item (73),

Assignee reads:

(73) Assignee: MURATO MANUFACTURING CO., LTD., Nagaokakyo-shi, Kyoto-Fu (JP)

Assignee should read:

(73) Assignee: MURATA MANUFACTURING CO., LTD., Nagaokakyo-shi, Kyoto-Fu (JP)

Signed and Sealed this  
Twenty-fourth Day of May, 2016

Michelle K. Lee  
*Director of the United States Patent and Trademark Office*